Figure 4:
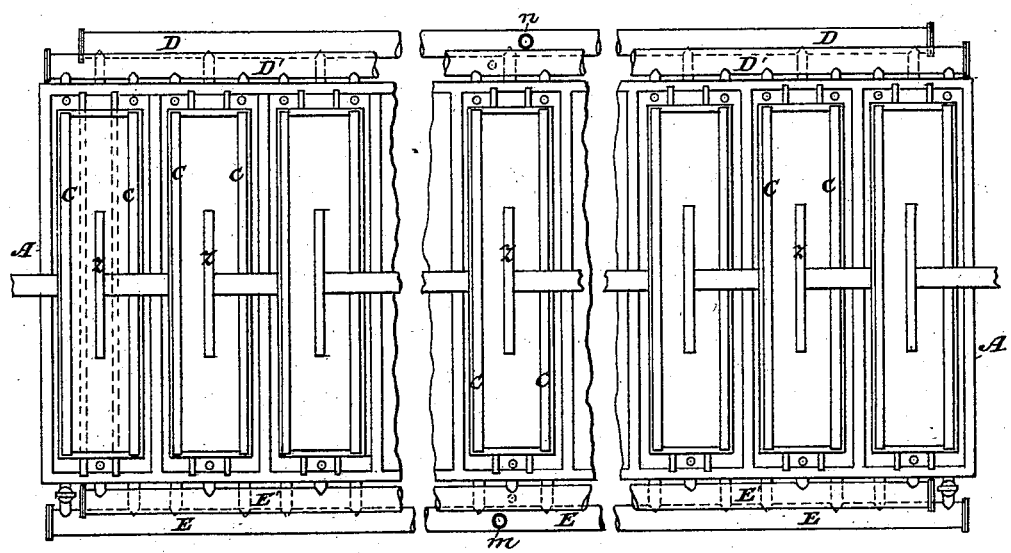

(No Model.) 2 Sheets—Sheet 1.
A. IMSCHENETZKY.
GALVANIC BATTERY.
No. 400,215. Patented Mar. 26, 1889.
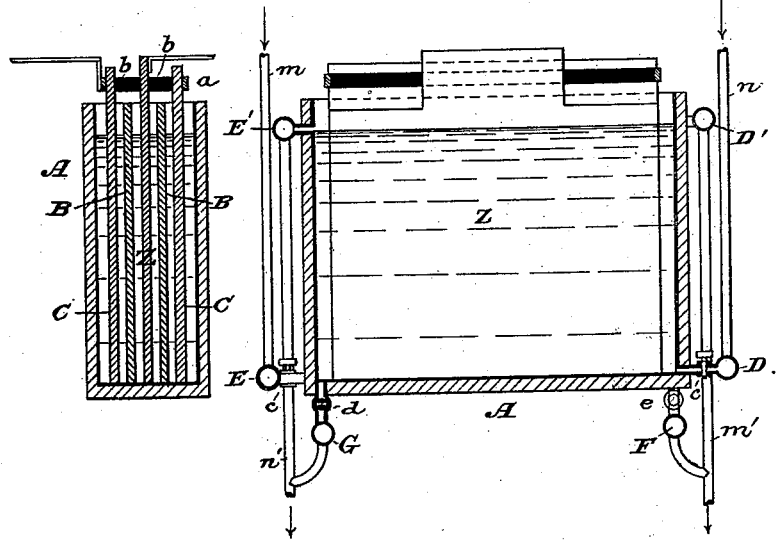
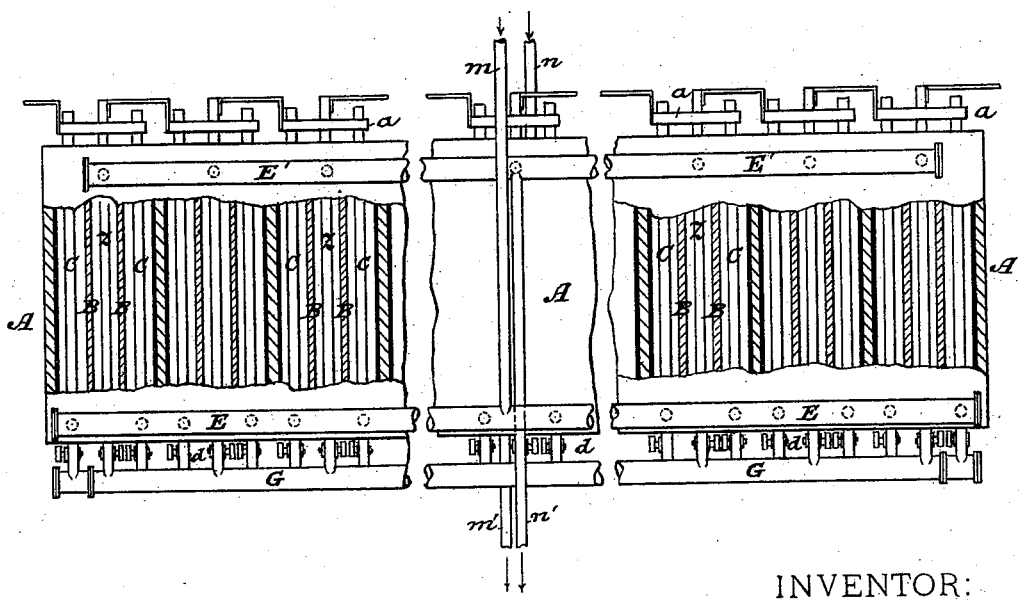

(No Model.) 2 Sheets—Sheet 2.

A. IMSCHENETZKY.
GALVANIC BATTERY.

No. 400,215. Patented Mar. 26, 1889.

WITNESSES:

INVENTOR:
Alexander Imschenetzky,
By Henry Connett
Attorney.

UNITED STATES PATENT OFFICE.

ALEXANDER IMSCHENETZKY, OF ST. PETERSBURG, RUSSIA.

GALVANIC BATTERY.

SPECIFICATION forming part of Letters Patent No. 400,215, dated March 26, 1889.

Application filed July 21, 1888. Serial No. 280,586. (No model.) Patented in France June 29, 1888, No. 191,498.

*To all whom it may concern:*

Be it known that I, ALEXANDER IMSCHENETZKY, a captain in the Russian army, and a resident of St. Petersburg, Russia, have invented certain new and useful Improvements in Galvanic Batteries, (for which a patent has been granted in France, No. 191,498, dated June 29, 1888,) of which the following is a specification.

My invention relates to galvanic cells and batteries, and the leading purpose of the invention is to prevent polarization and lessen the internal resistance of the cell by the employment of depolarizing-liquids, and by providing the battery with means for compelling circulation of the liquids in the cells.

My invention will be fully described hereinafter, and its novel features carefully defined in the claims.

In all galvanic cells known up to the present, so far at least as I am aware, the zinc or other electro-positive metal has been placed in a liquid capable of dissolving the oxide of the metal formed by the action of the oxygen which is disengaged at the surface of the metal. This condition is necessary in order to keep the surface of the metal free from all deposits and assure its contact with the liquid. The other electrode has always been placed in a liquid rich in oxygen and permitting its ready combination with the hydrogen disengaged at the electrode. The zinc in these cells acts as a depolarizer for the oxygen. I have found that by placing the zinc not in a liquid capable of dissolving its oxide, but in a liquid which is itself capable of being oxidized and of which the affinity for oxygen is greater than that of the zinc, this liquid, and not the zinc, becomes the depolarizing agent and the zinc remains unaltered. It is evident that the zinc ought not to enter into chemical combination with the liquid and replace the metal of the salt.

For electrodes I employ zinc and carbon. The liquids are: that for the zinc, a solution of a sulphite or hyposulphite of any alkaline metal, as hyposulphite of soda ($Na_2S_2O_3$) or the sulphite of soda, ($Na_2SO_3$,) and that for the carbon any oxidizing-liquid whatever, as nitric acid, a mixture of nitrate of potash with sulphuric acid, or dilute manganic acid, chromic acid, &c. The choice of these substances will depend on local and economic considerations. Thus, for electrical installations on a large scale, provided with a laboratory or special regenerating-plant, it will be advantageous to employ a sulphite or hypo-sulphite and dilute manganic acid, ($KMnO_4 + H_2SO_4 + H_2O$,) for this combination gives the highest electro-motive force, and the chemical products formed in the cells may be easily regenerated. During the action of the cell the sulphite or hyposulphite of soda ($Na_2SO_3$) or ($Na_2S_2O_3$) is transformed into sulphate of soda ($Na_2SO_4$) and the manganic acid ($2KMnO_4 + H_2SO_4$) into sulphate of potash and peroxide of manganese, ($K_2SO_4 + 2MnO_2$.) Water ($4H_2O$) is also formed. The sulphate of soda formed in the cell, being calcined with carbon, gives sulphide of sodium, ($Na_2S$,) and the solution of this latter, being saturated with sulphurous-acid gas, is transformed into hyposulphite of soda, ($Na_2S_2O_3$;) or in lieu of this, to obtain the sulphite of soda, ($Na_2SO_3$,) we may transform the sulphate of soda ($Na_2SO_4$) into carbonate ($Na_2CO_3$) and the solution of this latter into sulphite of soda ($Na_2SO_3$) by means of sulphurous-acid gas. The sulphate of potash ($K_2SO_4$) may be transformed into carbonate ($K_2CO_3$) and into the hydrate (KOH) of potash, and this latter, being calcined with peroxide of manganese, ($MnO_2$,) gives manganate of potash, ($K_2MnO_4$,) which, by simply heating its solution, is transformed into permanganate of potash, ($KMnO_4$.) This transformation may also be produced by other means; but in all cases only the following materials are needed: sulphur, carbonate of lime or hydrated lime, carbon, and the necessary fuel for calcination and evaporation. The sulphites and hyposulphites of potash and soda may be employed indifferently, for they give nearly equal electro-motive force. Either may be employed, as economy dictates. For a smaller electrical installation, where there is no laboratory, and in general where the regeneration of the liquids and deposits would not prove profitable, it is more advantageous, in view of obtaining the current at the least possible cost, to employ for the zinc the hyposulphite of soda, which is cheap, and which may be easily preserved without deterioration; and for the carbon, in place of manganate of potash, which is comparatively expensive, any oxidizing-liquid may be used, as chromic or nitric acid or a mixture of saltpeter and sulphuric acid; but the electro-motive force will not be so great in this case. The battery-liquids should have equal densities.

In the drawings I have shown a battery constructed according to my invention and especially adapted for use with the liquids I have described.

Figure 5:
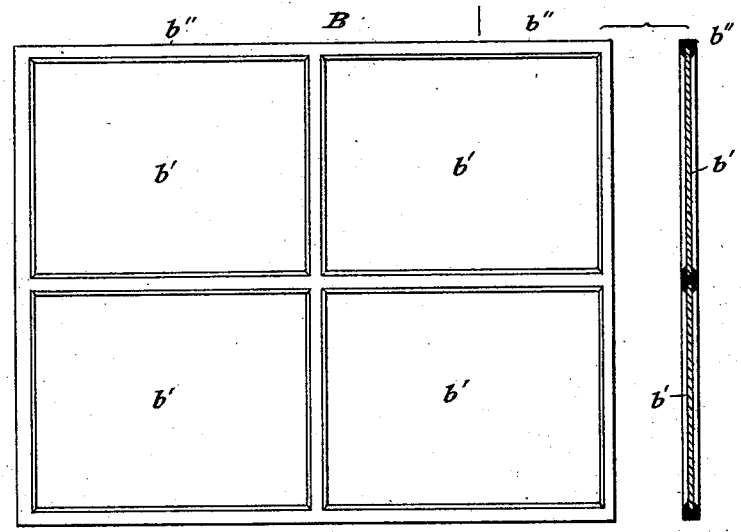

Figure 1 is a transverse vertical section of a single cell, showing the arrangement of the electrodes and partitions therein. Fig. 2 is a longitudinal vertical section of a cell, showing the pipes for compelling circulation of the battery-liquids. Fig. 3 is a side elevation of a battery of several cells. In this view a part of the wall of the cup or box is broken away, so as to expose the interior parts. Fig. 4 is a plan of the battery. Fig. 5 is a detail view showing (in elevation and transverse section) a porous ceramic partition adapted for large cells.

A is the box, tray, or cup of the cell or battery. This cup may be of wood or metal, and should be lined interiorly with resin, bitumen, paraffine, or the like. It is divided into three compartments by two partitions, B B. These partitions are of some porous material not liable to be acted on by the battery-liquids, as terra-cotta or soft burned and unglazed clay. In the middle compartment is placed the positive electrode Z, of laminated zinc, and in the two outer compartments are placed the two carbon electrodes C C. These carbons are connected at their upper ends by a metallic ring, $a$, and are isolated from the zinc by blocks $b\ b$, of some suitable non-conducting material.

For cells of moderate dimensions the partitions B B may each be made of a single piece of terra-cotta or the like; but for large cells the construction illustrated in Fig. 5 may be employed—that is to say, the small plates or "panes" $b'$ of terra-cotta may be set in a sash, $b''$, of iron. In setting these plates in the frame their edges are coated with a suitable resin or varnish before insertion, and the metal frame must be coated also with some similar material.

In constructing the battery, it is desirable to reduce the size of the cells as much as possible and to arrange the electrodes as near together as possible, with a view of lessening the internal resistance of the battery. To insure the regular action of the battery, it is necessary, however, that there shall be considerable liquid about the electrodes. These two conditions may be realized by making the liquids circulate continuously through the compartments of the cells.

In Figs. 2, 3, and 4 the battery is shown provided with means for compelling the circulation of the two liquids therein. The liquids are contained in separate elevated reservoirs, (not shown,) and are conveyed down to the respective compartments of the battery-cells by supply $m$ and $n$ and distributing-pipes D and E, these latter extending lengthwise of the battery near its bottom. These distributing-pipes D and E distribute the liquids to the respective compartments of the cells through branches $c\ c$, provided each with a cock, which serves to cut off any particular cell from the others for the purpose of cleaning or repairing it. The pipe D is connected with the middle compartments of the cells and the pipe E with the outer compartments thereof. At the level of the liquids in the compartments of the cells are arranged pipes $D'$ and $E'$, the former connecting with the middle compartments of the cells and the latter with the outer compartments. The liquids overflow into these pipes, respectively, and are led away from these pipes $D'\ E'$, respectively, by pipes $m'\ n'$, which may connect with any suitable receiving-reservoirs arranged at a lower level than the battery, and not shown.

In order to draw off the liquids from the cells, I provide two longitudinal pipes, F and G, arranged below the battery and connected, respectively, with the pipes $n'$ and $m'$. The pipe F is connected with the middle compartments of the several cells by cock-controlled branches $e$, and the pipe G is connected in the same manner with the exterior compartments by cock-controlled branches $d$.

The principal advantages of the construction above described are these:

First. The distance from one electrode to the other in each cell is reduced to a minimum.

Second. The continuous and upward circulation of the liquids about the electrodes assures the separation of the bubbles of gas that may form there, and this diminishes the polarization and the internal resistance.

Third. The electrodes remain in contact with fresh liquids having a constant composition. This also serves to diminish polarization and to protect the zinc from oxidation.

Fourth. The arrangement and construction described materially facilitates the charging, discharging, and washing out of the cells.

Fifth. The battery when thus arranged and constructed occupies less space than a battery having a constant volume of liquid.

I am aware that it is not new to provide a battery-cell with supply and outlet pipes for the liquids, the supply-pipe being arranged at the top and the outlet-pipe at the bottom of the cell, and this I do not claim; but by arranging the supply-pipe at the bottom and the overflow-pipe at the mean level of the battery-liquids, thus forcing the fresh liquid up around the electrodes, I render the polarization of the battery from gas-bubbles almost impossible, as the upward current carries them with it to the surface.

Having thus described my invention, I claim—

1. A galvanic element having a carbon electrode, a zinc electrode, and two liquids in which the said electrodes are respectively immersed, the liquid about the carbon consisting of dilute manganic acid and the liquid about the zinc consisting of a solution of a sulphite or hyposulphite of an alkaline metal.

2. The combination, with a battery element having different compartments and liquids for the electrodes, of the supply-pipes $m$ and $n$, the distributing-pipes D and E, the overflow-pipes D', E', $m'$, and $n'$, and the drainage-pipes F and G, said drainage-pipes being connected with the pipes $m'$ and $n'$, respectively, substantially as set forth.

In witness whereof I have hereunto signed my name in the presence of two subscribing witnesses.

ALEXANDER IMSCHENETZKY.

Witnesses:
 N. TSCHENALOFF,
 I. HIERLING.